United States Patent

[11] 3,593,742

| [72] | Inventor | Julian S. Taylor<br>8600 S.W. 8, Oklahoma City, Okla. 73128 |
|---|---|---|
| [21] | Appl. No. | 836,123 |
| [22] | Filed | June 24, 1969 |
| [45] | Patented | July 20, 1971 |

[54] FLUID FLOW REGULATOR
3 Claims, 5 Drawing Figs.

[52] U.S. Cl........................................... 137/504,
137/269, 137/552, 138/46
[51] Int. Cl.......................................... F16k 1/44
[50] Field of Search............................ 137/504,
552, 269, 271; 138/46

[56] References Cited
UNITED STATES PATENTS

| 257,069 | 4/1882 | Reznor | 137/504 X |
| 2,149,673 | 3/1939 | Godfrey | 137/504 X |
| 2,198,487 | 4/1940 | Sisk | 137/504 |
| 2,584,418 | 2/1952 | Branson | 137/504 |
| 2,865,397 | 12/1958 | Chenault | 137/504 |
| 2,948,296 | 8/1960 | Thorburn | 138/46 X |

FOREIGN PATENTS

| 836,439 | 6/1960 | Great Britain | 137/504 |

Primary Examiner—Harold W. Weakley
Attorney—Robert K. Rhea

ABSTRACT: A hollow housing, having inlet and outlet ports, forms a fluid passageway. A piston, loosely received by the inlet end portion of the housing, is coaxially connected with a throttle comprising a poppet-type valve stem which extends through and seats on respective end portions of a cage positioned in the outlet end portion of the housing communicating with the outlet port. A spring, interposed between the piston and the cage, normally urges the throttle toward an open position and equalizes fluid pressure against the throttle at the respective ends of the cage in response to variations in fluid pressure across the piston.

PATENTED JUL 20 1971 3,593,742
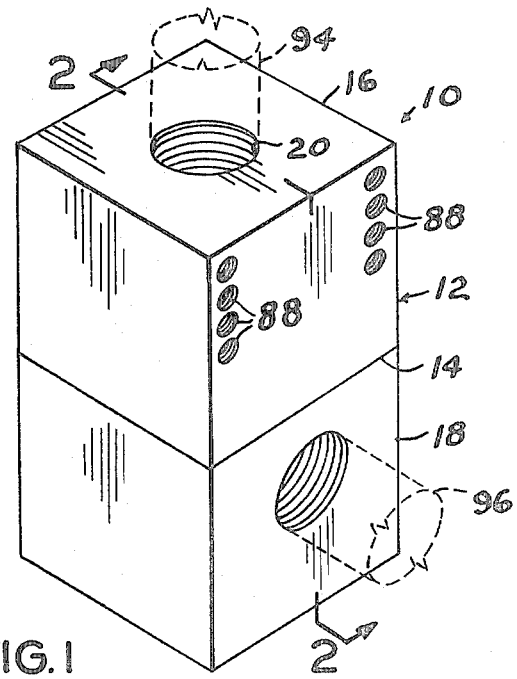
FIG.1
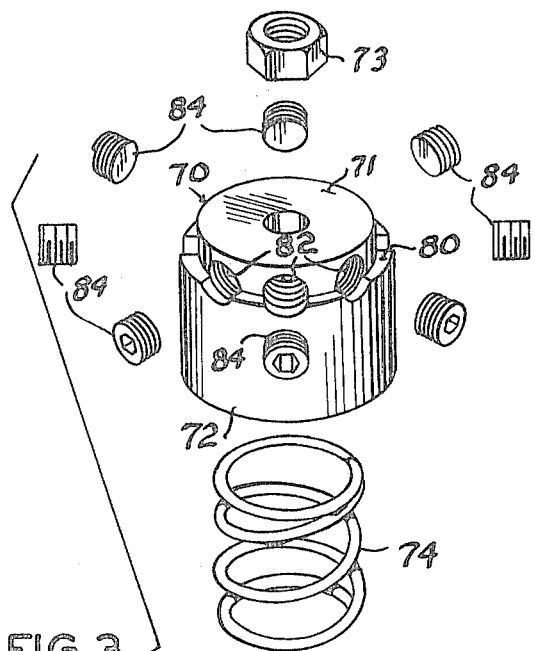
FIG.3
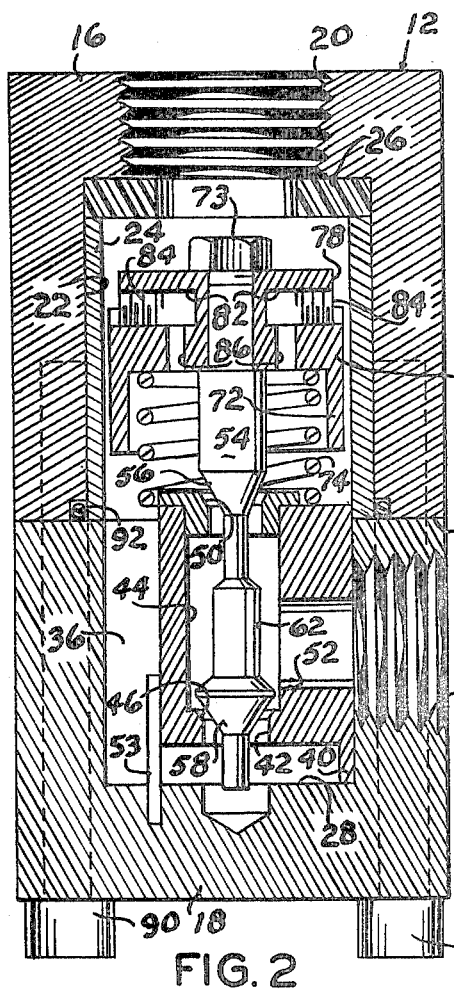
FIG.2
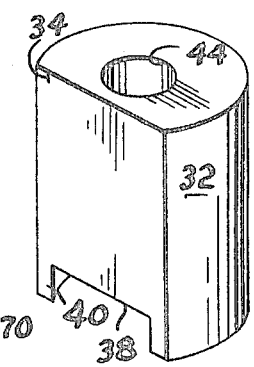
FIG.4
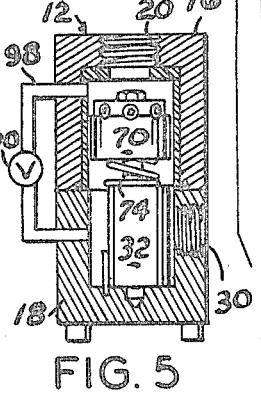
FIG.5
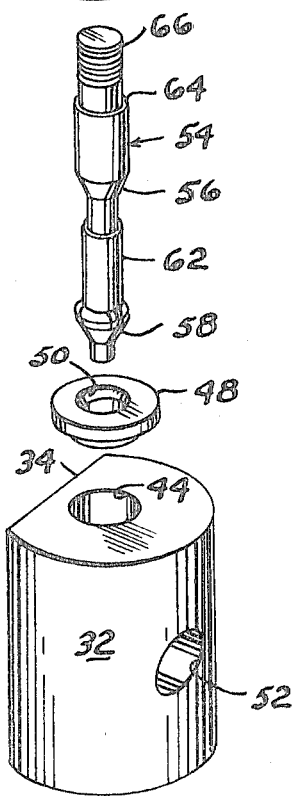
JULIAN S. TAYLOR
INVENTOR.
BY
Robert K. Rhea
AGENT 3,593,742

FLUID FLOW REGULATOR

BACKGROUND OF THE INVENTION

1. Field of the Invention

The present invention relates to constant fluid flow regulators and more particularly to a flow regulator having a spring-urged piston connected with poppet-type valves and arranged for equalizing fluid pressure at opposite ends of the poppet valves.

In the steel fabricating and processing industry it is desirable to employ a constant fluid flow regulator, as for example, where the fluid is used as a coolant. Most of the coolant fluids contain impurities, such as small particles of dirt, scale, rust, or the like, which do not hamper the function of the coolant. It is impractical, from an economic standpoint, to provide a filter to clean the fluid for the reason that the fluid is repeatedly used and impurities are constantly being added thereto. Furthermore, the source of fluid, such as a pond may contain various impurities.

2. Description of the Prior Art

Constant fluid flow regulators usually employ sliding sleeves for opening and closing ports of the regulators. The sliding sleeve-type valve is necessarily formed with tolerances to prevent leakage and as a result of the tight fit or tolerance impure fluids hamper or interrupt operation of such regulators.

This invention, on the other hand, is arranged for the passage of impurities in a fluid through a piston-equipped flow passage by using poppet-type valves to compensate for the major pressure drop.

SUMMARY OF THE INVENTION

A hollow housing is provided with an inlet and outlet port in its respective end portions. A loose-fitting piston, slidably received by the inlet end portion of the housing, forms an orifice or restriction of the flow passage. The piston is coaxially connected with a throttle comprising poppet-type valve stems extending through and sealing with seats formed at the respective ends of a cage in the outlet end portion of the housing. The cage is provided with an outlet port communicating with the housing outlet port. A spring is interposed between the piston and the cage for normally urging the throttle to an open position. Selectively opened and closed orifices, formed on the piston, increase or interrupt the fluid flow therethrough. Equal and opposite fluid pressure is impressed on opposite ends of the throttle for opening and maintaining the throttle in fluid-passing position and insuring a constant flow through the regulator as a result of fluid pressure differential across the loose-fitting piston being balanced by the force of the spring.

The principal object of this invention is to provide a fluid flow regulator which is arranged to pass fluid containing impurities and where equal pressures of the fluid will be impressed on opposite sides of valves and seats to maintain a balanced condition and a constant flow from an outlet port in response to a relatively constant fluid pressure differential maintained across a loose-fitting piston intersecting the flow passage of the regulator.

BRIEF DESCRIPTION OF THE DRAWINGS

FIG. 1 is a perspective view of the regulator illustrating inlet and outlet pipes connected thereto by dotted lines;

FIG. 2 is a vertical cross-sectional view, to a larger scale, taken substantially along the line 2-2 of FIG. 1;

FIG. 3 is an exploded perspective view of the piston, throttle and spring;

FIG. 4 is a perspective view of the cage rotated substantially 90° about its longitudinal axis from the position shown in FIG. 3; and, FIG. 5 is a vertical cross-sectional view, to a reduced scale, illustrating an alternative embodiment.

DESCRIPTION OF THE PREFERRED EMBODIMENTS

Like characters of reference designate like parts in those figures of the drawings in which they occur.

In the drawings:

The reference numeral 10 indicates the device, as a whole, which is rectangular in general configuration comprising an elongated housing 12 which is divided intermediate its ends, as at 14, to form an upper or inlet end portion 16 and a depending or outlet end portion 18. The inlet end portion 16 is centrally bored and threaded, as at 20, to form an inlet port. The other end of the inlet end portion is counterbored, as at 22, for receiving a sleeve 24. A centrally bored, preferably plastic material, disclike seat 26 is interposed between the sleeve 24 and the inlet port 20 for the purposes presently explained.

The outlet end portion 18 is coaxially bored equal to the inside diameter of the sleeve to form a socket 28. The wall of the outlet end portion 18 is provided with a lateral threaded bore 30 forming an outlet port communicating with the socket 28. The socket 28 receives a cage 32. The cage 32 is cylindrical in general configuration having a periphery received by the wall forming the socket 28. The side of the cage 32 is longitudinally subtended to form a flat surface 34 defining a fluid bypass 36 between its surface 34 and the wall forming the socket 28. The depending end of the cage is undercut or recessed, as at 38, defined by an arcuate outer wall 40 to form a continuation of the fluid bypass 36. The cage is coaxially bored, as at 42, and counterbored, as at 44, to form an annular seat 46 in its depending end portion. A flanged sleeve 48 is coaxially received by the cage counterbore 44 for forming a valve seat 50 at its end opposite the valve seat 46. The cage is further provided with a lateral bore 52 intermediate its ends and opposite its flat surface 34 coaxial with the housing outlet port 30. A pair of spaced locating pins or guides 53, only one being shown, inserted into the housing surface forming the bottom of the socket 28, contact the cage surface 34 to insure alignment of the cage port 52 with the housing outlet 30.

An elongated stem 54 is coaxially received by and projects through the cage 32. The stem is provided with upper and lower poppet-type valves comprising downwardly converging surfaces, as viewed in the drawings, 56 and 58 which seat and seal on the seats 50 and 46 respectively. The stem 54 is diametrically reduced, as at 60, between the valves 56 and 58 for free fluid flow through the counterbore 44. The upper end portion of the stem, as seen in the drawings, is diametrically reduced to form an annular shoulder 64 and externally threaded, as at 66. The stem 54, seats 46—50 and the cage 32 form a throttle.

A piston 70, having a head end portion 71 and a skirt 72, is coaxially received at its head end by the threaded end portion 66 of the stem and is secured thereon by a nut 73. Diametrically the piston 70 is slightly less than the inside diameter of the sleeve 24 so that impurities, such as scale, or the like, contained by a fluid, will not ordinarily impede to-and-fro sliding movement of the piston within the sleeve and will permit a constant flow of fluid around the periphery of the piston toward the other end of the housing. A helical spring 74 surrounds the stem 54 within the skirt 72 of the piston and is supported at its other end by the upper end surface of the cage 32. The spring 74 normally urges the valve surfaces 56 and 58 off their seats and the end surface of the piston head seated against the ring 26. The head end portion 71 of the piston is circumferentially reduced, as at 78, to form an annular shoulder 80. A plurality of circumferentially spaced threaded lateral openings 82 extend radially inward of the reduced surface 78 of the piston for receiving a like plurality of set screwlike plugs 84 for the purposes presently explained. The piston head 71 is provided with a like plurality of apertures 86 extending upwardly from its depending end and intersecting the inward end portion of the openings 82 to form orifices or auxiliary fluid passageways.

One outer surface of the housing end portion 16 is provided with a plurality of threaded bores or sockets 88 adapted for reception of the plugs 84 for the reasons presently explained.

The housing end portions 16 and 18 are joined in abutted relation, as shown in FIGS. 1 and 2, by a plurality of bolts 90 extending through respective corner portions of the housing and threadedly engaged with the end portion 16. An O-ring seal 92, nested by a suitable socket formed in the end portion 16, forms a fluidtight seal between the abutted end portions of the housing.

OPERATION

During the construction of the stem 54 the flanged seat-forming sleeve 48 is positioned between the stem surfaces 56 and 58 by dividing the stem and reconnecting it in any conventional manner. The cage 32 is positioned in the socket 28 adjacent the guides 53 with the piston 70 connected to the threaded end portion of the stem and the spring 74 interposed between the piston and cage. The housing end portion 16, containing the disc 28 and sleeve 24, is then joined to the housing outlet end portion 18 by the bolts 90. Fluid inlet pipes 94 and 96, shown by dotted lines (FIG. 1), are then connected to the fluid inlet and outlet ports 20 and 30, respectively. Fluid under pressure entering the inlet port 20 unseats the piston head, partially compresses the spring 74 and flows around the piston 70 to enter the fluid passage 36 so that fluid pressure is applied to the lowermost tapered surface 58 on the stem 54 below its seat 46 so that fluid passes through the valve seats 50 and 46 into the cage counterbore 44 and out the outlet port 30. Fluctuations in pressure entering the fluid inlet port 20 is compensated for by the spring 74 and equalized pressure on opposite sides of the poppet-type valve throttle by longitudinal movement of the piston to maintain a constant flow of fluid through the outlet port 30.

In the event that an additional volume of fluid flow through the regulator is desired, the housing end portions are separated and one or more of the plugs 84 are removed so that when reassembled additional fluid may flow through the respective orifice formed by the sockets 82 and bores 86. When the plugs 84 are removed from the piston, these removed plugs are placed in respective ones of the threaded sockets 88 on the exterior of the housing end portion 16 so that the operator may readily know how many, if any, of the orifices have been opened to increase the volume of fluid flow.

In the event of a back pressure of fluid or interruption of fluid pressure to the inlet port 20, the spring 74 will lift the piston head into sealing contact with the disc 26 thus forming a check valve against fluid flow toward the inlet port 20.

Alternatively this reverse check feature may be modified to permit a controlled rate of reverse fluid flow by forming lateral or radial grooves in the surface of the disc 26 contacted by the piston head.

Referring more particularly to FIG. 5, an alternative means of increasing fluid flow is provided so that the flow rate can be externally changed without disassembly of the regulator by connecting a bypass line 98 to suitable lateral bores formed in the wall of the housing at opposite ends of the piston therein wherein a valve 100, interposed in the line 98, may be opened for increased fluid flow around the piston 70.

Obviously the invention is susceptible to changes or alterations without defeating its practicability, therefore, I do not wish to be confined to the preferred embodiment shown in the drawings and described herein.

I claim:

1. A regulator for controlling fluid flow, comprising:
   a housing having an inlet and an outlet forming a flow passageway through the housing;
   a piston intersecting the flow passageway and being loosely received by said housing adjacent the inlet for forming a restricted fluid passageway around said piston;
   a cage in the housing intersecting a portion of the flow passageway adjacent the housing outlet,
   said cage having a central opening coaxial with said piston and having a lateral opening providing communication between its central opening and the housing outlet,
   said cage having valve seats, facing toward said piston, on its wall forming the central opening;
   a stem extending through the central opening of said cage and coaxially connected with said piston,
   said stem having spaced-apart valves thereon respectively seating and unseating on said valve seats for opening and closing the central opening of said cage in response to movement of said piston toward and away from said cage;
   a resilient member, interposed between said piston and said cage, normally biasing said piston toward the housing inlet in a valve unseating position; and,
   means forming a part of said piston for selectively increasing the flow capacity through said housing a predetermined quantity.

2. The regulator according to claim 1 in which said piston is provided with a head end portion,
   said piston head end portion having a plurality of orifices providing fluid communication therethrough; and, a like plurality of plug members removably closing the orifices.

3. The regulator according to claim 1 in which said piston is provided with a diametrically reduced head end portion facing toward the housing inlet,
   said reduced head end portion having a plurality of radial inwardly extending sockets,
   said piston head end portion having a plurality of radially spaced apertures, parallel with its axis, extending toward said housing inlet from its cage-directed end surface and intersecting the respective sockets; and,
   a like plurality of plug members removably closing the sockets.